June 19, 1928.                                                                1,674,454
A. R. SMITH
MEANS FOR SUPPLYING POWDERED FUEL TO FURNACES
Filed Sept. 22, 1925

Inventor:
Arthur R. Smith,
by *[signature]*
His Attorney.

Patented June 19, 1928.

1,674,454

UNITED STATES PATENT OFFICE.

ARTHUR R. SMITH, OF SCHENECTADY, NEW YORK, ASSIGNOR TO GENERAL ELECTRIC COMPANY, A CORPORATION OF NEW YORK.

MEANS FOR SUPPLYING POWDERED FUEL TO FURNACES.

Application filed September 22, 1925. Serial No. 57,807.

The present invention relates to the feeding of pulverized fuel to furnaces, the fuel ordinarily used being pulverized coal.

The object of my invention is to provide an improved method of and means for feeding pulverized fuel to furnaces which gives a uniform mixture of the fuel and air and an even distribution of the fuel and air to the several burners of the furnaces, and for a consideration of what I believe to be novel and my invention, attention is directed to the following specification and the claims appended thereto.

Figure 1:
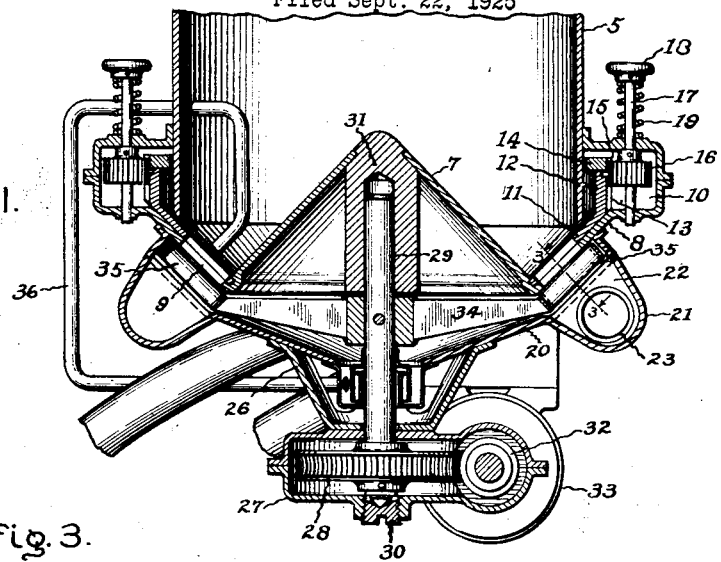
Figure 3:
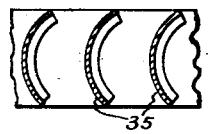
Figure 4:
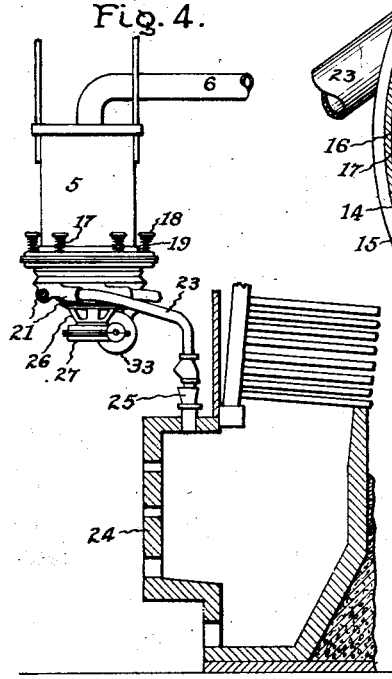
Figure 2:
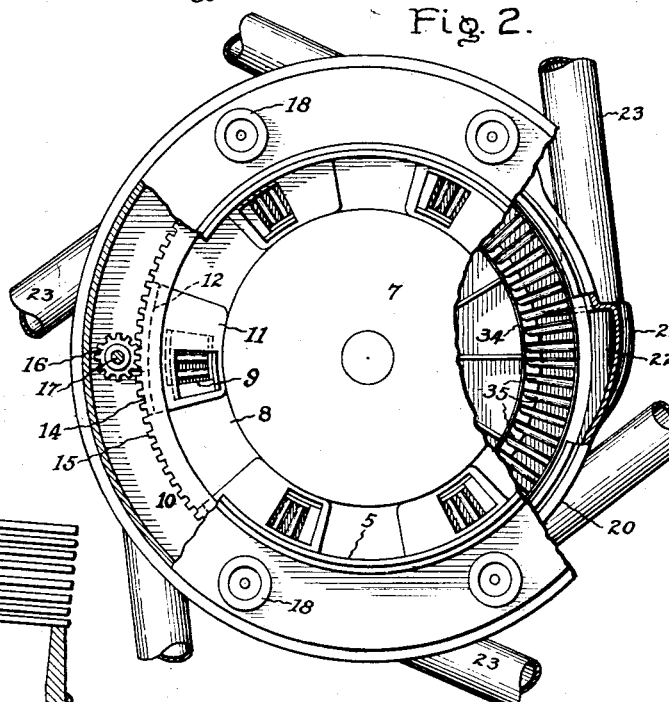

In the drawing Fig. 1 is a vertical sectional view of a fuel and air distributor embodying my invention; Fig. 2 is a top plan view thereof, parts being broken away in order to better illustrate the structure; Fig. 3 is a detail sectional view on an enlarged scale taken on line 3—3, Fig. 1; and Fig. 4 is a side elevation of the distributor illustrating its connection to furnaces.

In carrying out my invention, I utilize a powdered fuel and air mixture, the mixture having been formed in any suitable manner, and I provide a device for dividing up the mixture and apportioning it among the several burners of the furnaces. Heretofore it has been the custom, so far as I am aware, to distribute the fuel from the bins by means of screw feeders, the primary air being injected into the fuel after it leaves the screws. In other words, the fuel has been measured out for each individual burner and the primary air then added to it. According to my invention I mix the air and fuel first and then apportion it among the several furnaces. By this means I am enabled to obtain a more uniform mixture of the fuel and air and a more even distribution of it than has been obtained heretofore.

Referring to the drawing, 5 indicates a casing which may be supported in any suitable manner and at any desired point. Connected to the top of the casing is a conduit 6 through which a mixture of fuel and air, for example, powdered coal and air is supplied to the casing. The powdered coal and air may be mixed in any suitable way and by means of any suitable apparatus, the mixture supplied being the pulverized fuel mixed with the primary air. Fixed to the lower end of casing 5 is a structure which provides a bottom for the casing comprising a reentrant portion 7 and an angularly extending wall 8 having a series of circumferentially spaced passages or openings 9 therein. The upper portion of the structure comprises walls which provide an annular housing 10 surrounding the lower portion of casing 5. Each passage 9 is provided with a valve 11 by means of which it may be covered and uncovered. The valves lie against the inner surface of wall 8 and at their upper portions are provided with vertically extending parts 12 having gear teeth 13 thereon. This forms a gear segment integral with each valve 11. Resting on top of parts 12 is a ring gear 14 having teeth 15 on its outer surface. In annular housing 10 and adjacent to each valve 11 is a pinion 16 carried by a stem 17 which projects out through housing 10 and has a knob 18 on its end. Between knob 18 and the top wall of housing 10 is a spring 19 which serves normally to hold pinion 16 into engagement with the top wall of housing 10. Pinions 16 are of a width such that normally they mesh with both the gear teeth on parts 12 and ring gear 14. With this arrangement, when any one of the pinions 16 is turned, it turns its valve 11 and also the ring gear 14 which in turn serves to turn all the other valves 11 by reason of the connection between the pinions and the ring gear. On the other hand, when it is desired to adjust a valve 11 individually, then the particular pinion 16 may be pushed downward out of mesh with ring gear 14 so that when it is turned it moves only its valve 11. By this means it will be seen that any one of the valves may be adjusted individually or all the valves may be adjusted simultaneously.

Below wall 7 is an outer wall 20 provided with a plurality of projections 21 which form discharge chambers 22, there being a discharge chamber for each opening 9. Leading from each discharge chamber 22 is a discharge conduit 23 which leads to a burner of a furnace. In Fig. 4, 24 indicates a furnace and 25 a burner. It will be understood that each conduit 23 leads to a burner 25 connected to a furnace, such as the furnace 24. In the present instance six conduits 23 are shown and each would lead to its own burner. However, this number of conduits is shown only by way of example and any suitable number of discharge conduits may be provided.

Discharge chambers 22 are large at the end into which the conduit 23 is connected and gradually converge inward toward wall 8. This is shown best in Fig. 2 of the drawing.

Supported by wall 20 is a frame 26 on which is supported a casing 27. In casing 27 is a worm wheel 28 mounted on a shaft 29. Shaft 29 is carried by a step bearing 30 in the bottom wall of casing 27 and by a bearing 31 carried by wall 7. Meshing with worm wheel 28 is a pinion 32 driven by a suitable electric motor 33. Attached to shaft 29 is an impeller wheel or blower wheel 34 provided with buckets or vanes 35 which stand directly beneath wall 8 and revolve in proximity thereto, the buckets or vanes lying between the outer surface of wall 8 and chambers 22. This impeller wheel or blower wheel serves to take the mixture of fuel and air from casing 1 and discharge it to the respective chambers 22. 36 is a conduit which serves to take material which leaks to a point around shaft 29 and convey it back to casing 5 adjacent to the inlet side of the blower wheel vanes. The walls which form discharge chambers 22 are one continuous structure and at each end of the chambers they extend into close proximity to the discharge edges of vane ring 35. There is thus formed, in substance, a series of circumferentially spaced pockets, one adjacent to each opening or passage 9, and each separate from the others.

With the above described arrangement, when motor 33 is running, driving the blower wheel 34, the buckets or vanes 35, as they pass each individual opening 9, suck fuel and air from casing 5 and discharge it to the adjacent chamber 22. As the blower wheel revolves, therefore, there will be a continuous flow of air and fuel through each opening 9 to the chamber 22 with which it communicates. If the valves 11 are all open to the same extent, then the amount of fuel and air discharged to each chamber will be the same. If it is desired to vary the amount of fuel supplied to all the chambers 22 in the same proportion, all the valves 11 may be operated simultaneously to adjust the position of the valves by turning one of the pinions 16 as already described. On the other hand, if for any reason, it is desired to vary the amount of fuel and air supplied to any individual burner, then the valve 11 for such burner may be adjusted alone in the manner already described. If the various valves 11 are set differently in accordance with the requirements of the different burners, then when all are adjusted simultaneously they will be charged in proportionate amounts. Instead of using the valve arrangement shown, I may use any other suitable arrangement for accomplishing the desired result. For example, in adjusting the valves individually the width of the openings may be reduced radially while in adjusting the valves simultaneously the widths may be reduced circumferentially.

The impeller wheel or blower wheel serves to a considerable extent to mix the fuel and air and to discharge an even mixture to each of the chambers 22. Also it functions to apportion the mixture in the described manner among the several chambers. By my invention therefore, I am enabled to supply pulverized fuel and primary air to a number of burners in the desired amounts. At the same time I can easily vary and adjust the mixture supplied to all the burners or to any individual burner.

My invention has the advantage, also, that the casing 5 may be located at any desired point and be connected to the furnaces by relatively small pipes.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. The combination with a plurality of pulverized fuel burners, of a bin, means through which pulverized fuel and air mixture may be supplied to said bin, conduits leading from the lower end of said bin to said burners, a vertical shaft projecting into said bin, a centrifugal blower in said bin carried by said vertical shaft, and means providing passages for conveying fuel and air mixture from said blower to said conduits.

2. The combination with a plurality of pulverized fuel burners, of a bin, means through which pulverized fuel and air mixture may be supplied to said bin, conduits leading from the lower end of said bin to said burners, a vertical shaft projecting into said bin, a centrifugal blower in said bin carried by said vertical shaft, means providing passages for conveying fuel and air mixture from said blower to said conduits, and means located in the bin for regulating the amount of mixture supplied by the blower to the respective passages.

3. The combination with a plurality of fuel burners, of a bin, means through which pulverized fuel and air mixture may be supplied to the bin, a series of spaced discharge chambers surrounding the bin, conduits connecting the chambers to the burners, spaced passages connecting the bin to said chambers and a centrifugal blower for discharging fuel and air mixture from the bin through said passages to said discharge chambers.

4. The combination with a plurality of pulverized fuel burners, of a bin, means through which pulverized fuel and air mixture may be supplied to said bin, conduits leading from the lower peripheral portion of said bin to said burners, a vertical shaft projecting into said bin, a centrifugal blower in said bin carried by said shaft, means providing passages for conveying fuel and air mixture from said blower to said conduits, and a valve in the bin for regulating the amount of air and fuel mixture supplied to each passage.

5. A distributor for a mixture of fuel and air comprising a casing, a series of discharge chambers surrounding the casing, a conduit connected to each discharge chamber, spaced passages connecting the casing to said chambers, an impeller wheel for discharging fuel and air mixture from the casing through said passages to said discharge chamber, and valve means for adjusting the area of said passages.

6. A distributor for a mixture of fuel and air comprising a casing, a series of discharge chambers surrounding the casing, a conduit connected to each discharge chamber, spaced passages connecting the casing to said chambers, an impeller wheel for discharging fuel and air mixture from the casing through said passages to said discharge chamber, a valve controlling each passage, and means for adjusting said valves either individually or simultaneously.

7. A distributor for a mixture of fuel and air comprising a casing having a series of circumferentially-spaced discharge openings at its lower end, means within the casing for directing a fuel and air mixture toward said openings, a centrifugal blower the blades of which rotate past said openings for effecting passage of fuel and air mixture through the openings, and discharge conduits to which fuel and air mixture is delivered by said centrifugal blower.

8. A distributor for a mixture of fuel and air comprising a casing having a series of circumferentially spaced discharge openings at its lower end, means within the casing for directing a fuel and air mixture toward said openings, a vertical shaft projecting into the casing, a centrifugal blower carried by said shaft, the blades of said blower rotating past said openings for effecting passage of fuel and air mixture through said openings, and discharge conduits to which fuel and air mixture is delivered by said centrifugal blower.

In witness whereof I have hereunto set my hand this 19th day of September 1925.

ARTHUR R. SMITH.